INVENTORS.
JAMES M. HARRISON
DANIEL R. GAUL
BY Parker & Carter
Attorneys.

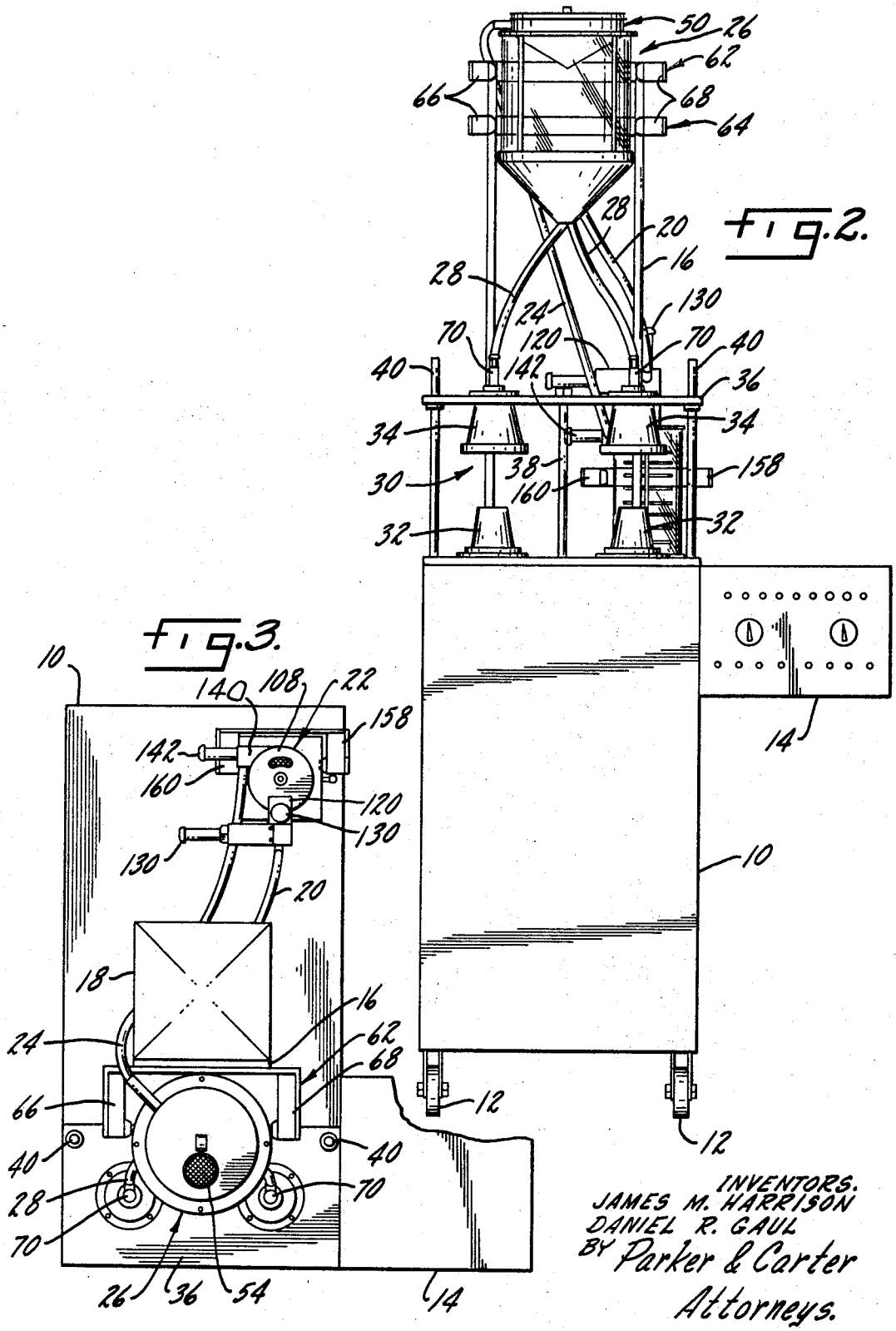

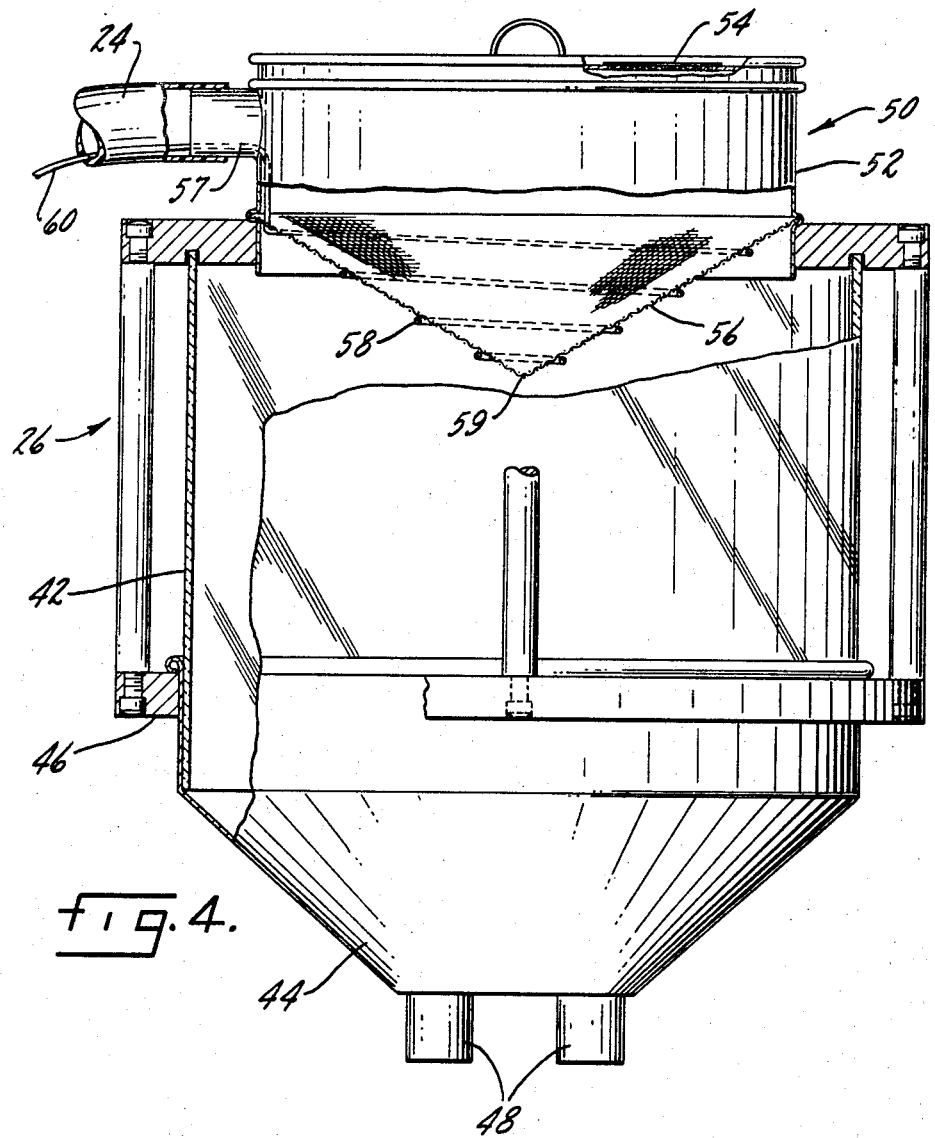

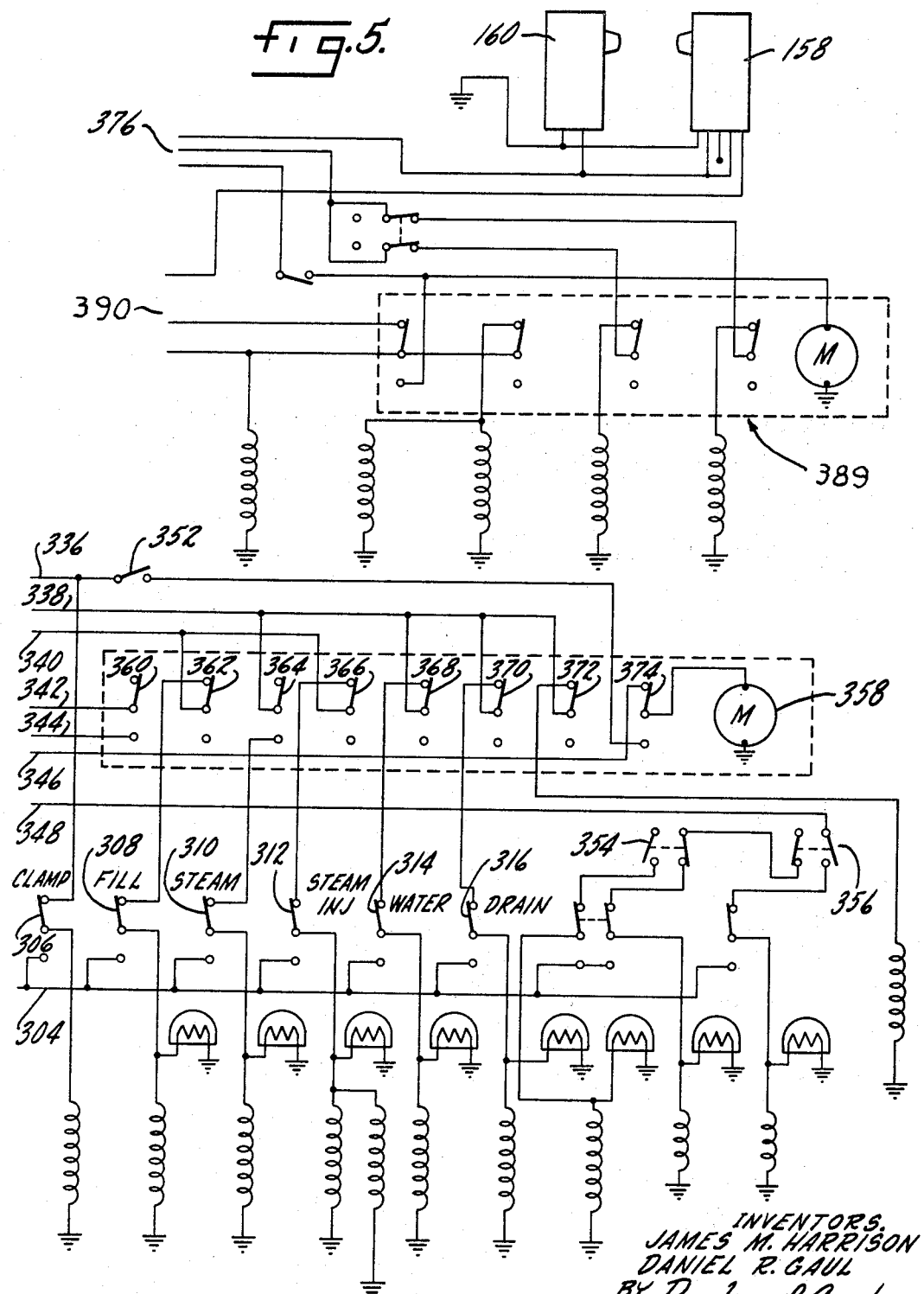

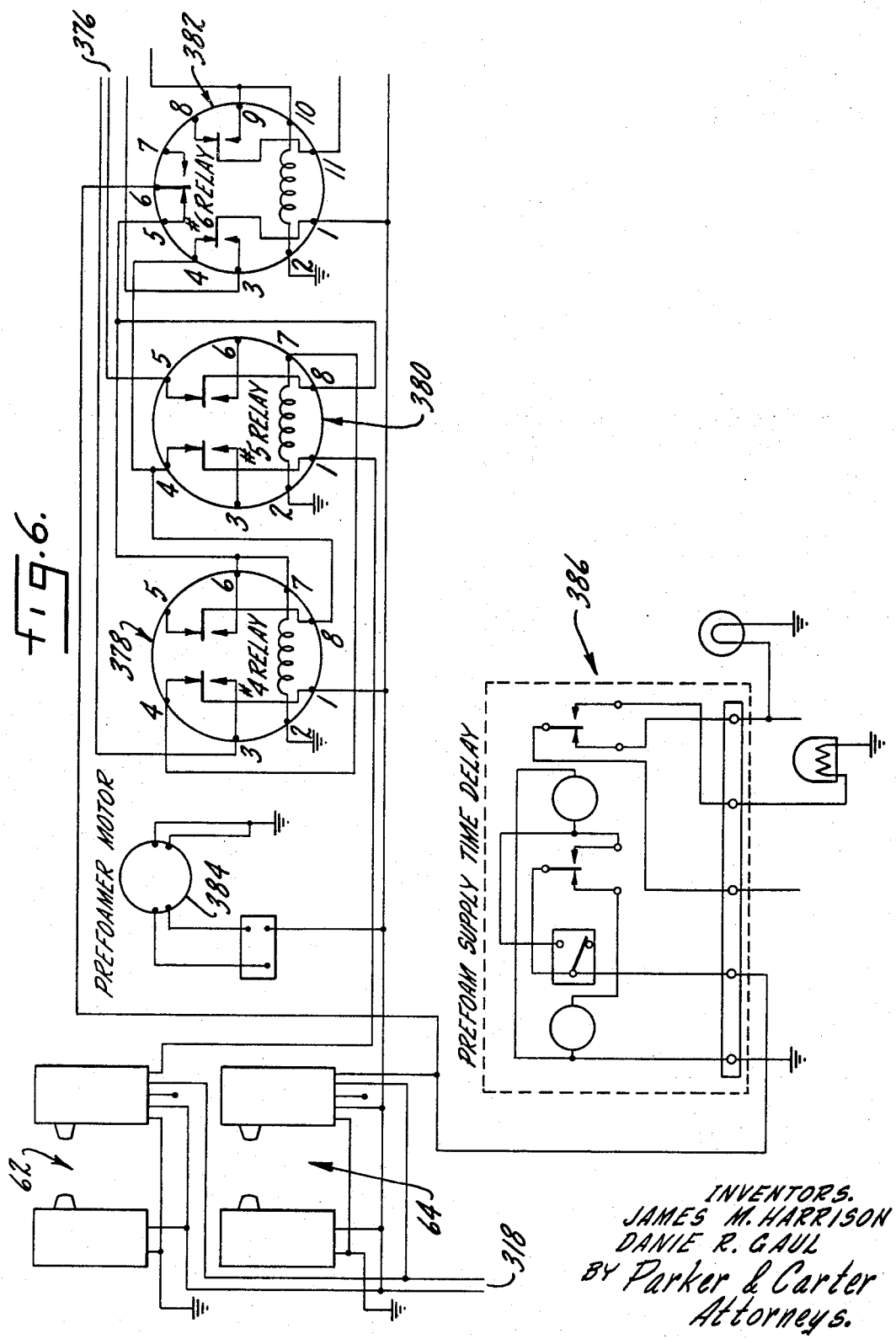

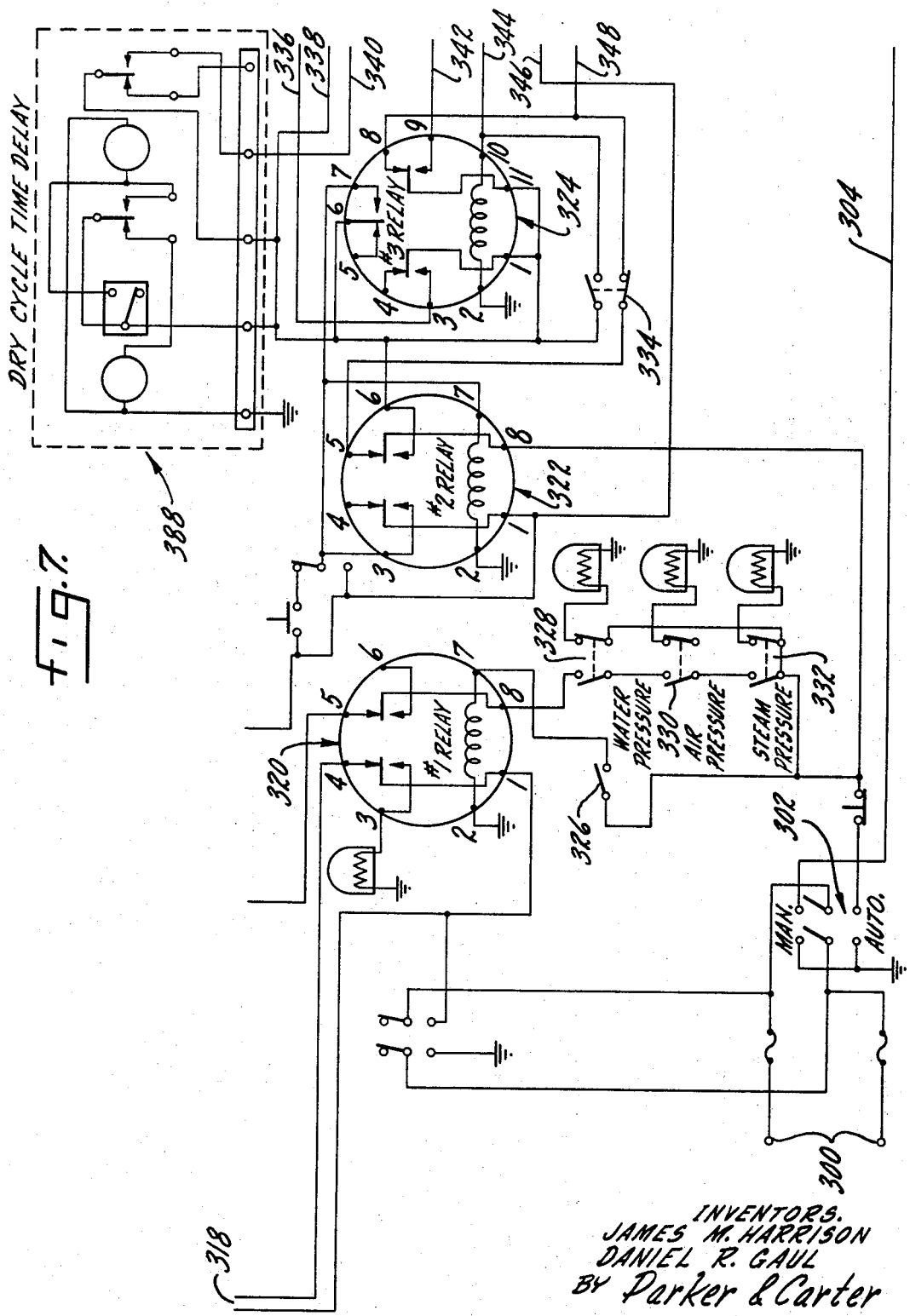

United States Patent Office 3,417,169
Patented Dec. 17, 1968

3,417,169
METHOD AND APPARATUS FOR AUTOMATI-CALLY MOLDING FOAM PLASTIC ARTICLES
James M. Harrison and Daniel R. Gaul, Fort Worth, Tex., assignors to Crown Machine & Tool Co., Arlington, Tex., a corporation of Texas
Filed Nov. 26, 1965, Ser. No. 509,994
13 Claims. (Cl. 264—51)

ABSTRACT OF THE DISCLOSURE

This is concerned with an integral foam molding machine and method in which the material is prefoamed and supplied to a molding mechanism, each of which operates on a cycle basis with the rate of supply of the prefoamed material being related to the rate of consumption by the molding mechanism such that the prefoamed material is consumed rapidly and the various operations are fully coordinated. The supply arrangement functions as a part of the control between the prefoaming arrangement and the molding arrangement.

---

Figure 1:
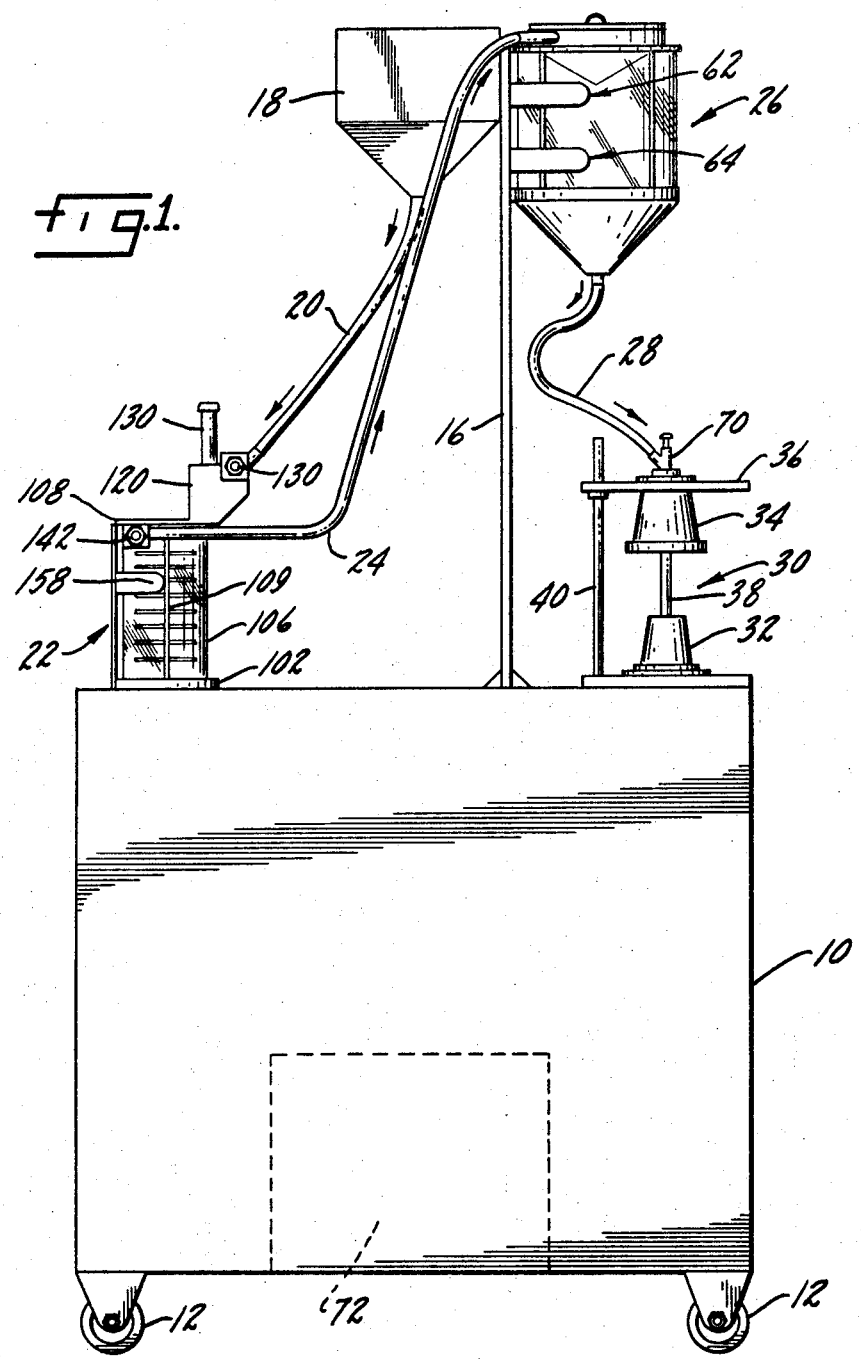

This invention is concerned with a molding machine and method for automatically molding foam plastic articles, such as hot drink thin wall cups or the like.

A primary object of the invention is a mechanism and method for automatically molding thin wall articles with a minimum of supervision and service.

Another object is a mechanism and method which automatically shuts down when any one of its important functions is not operating properly.

Another object is a mechanism and method for molding foamable plastic articles on a continuous basis with a minimum of delay time betwen prefoaming and molding so that the prefoamed beads do not age or deteriorate.

Another object is a mechanism and method of the above type which insures that the molding arrangement receives beads of an accurate density.

Another object is a molding mechanism and method which insures that the molding cavity receives partially foamed beads of an accurate quality.

Another object is a fully automated molding mechanism and method for thin wall foam plastic articles.

Other objects will appear from time to time in the ensuing specification and drawings in which:

FIGURE 1 is a side view of a molding machine;
FIGURE 2 is a front view thereof;
FIGURE 3 is a top view thereof;
FIGURE 4 is an enlarged view, partially in section, of the prefoam hopper; and
FIGURES 5, 6 and 7 are schematics of the circuit diagram.

In FIGURE 1, the machine has a base or cabinet 10 which may be mounted on wheels 12 and at a suitable location may be provided with a control panel 14, in FIGURE 2. On the top a suitable framework 16 supports a supply hopper 18 for foamable plastic, finely divided beads, such as polystyrene, containing a blowing agent, such as butane or the like. A suitable tube 20 brings the beads to a prefoamer 22 where the beads are partially foamed. From the prefoamer, the beads travel by supply tube 24 to a prefoam hopper 26, also supported on frame 16. From the bottom of the prefoam hopper 26, prefoamed beads are supplied by suitable flexible tubes 28 to mold cavities 30. Two such mold cavities have been shown for making thin wall cups, molded in an upside down position. Each such cavity includes a core element 32 which may be mounted in a generally stationary position on the cabinet 10 with a cavity element 34 mounted on a suitable upper cross frame 36 which may be raised and lowered by a piston inside of the cabinet, not shown, through a piston rod 38. To insure alignment and stability, guide rods 40 may be used. After the foamed plastic articles are formed, they may be removed in any suitable manner.

FIGURE 4 shows the details of the prefoam hopper 26 which may take the form of a cylindrical housing 42 with a bottom funnel 44 held in place by a frame mechanism 46 with the tubes 28 leading to the mold cavities being connected to discharge ports 48. The supply tube 24 from the prefoamer connected to a strainer arrangement 50 mounted on top of the frame 46 which may take the form of a generally cylindrical housing 52 with upper and lower screens 54 and 56, the opening 57 for the supply tube 24 entering the strainer between the screens.

The partially foamed beads from the supply tube 24 enter the strainer 50 and flow down through the lower screen 56 which is somewhat conically shaped, disposed downward. The size of the screen is such, relative to the intended size of the prefoam material, that only the large oversize plastic particles will fail to pass. The vast majority of the material will pass through the screen 56 and will collect in the hopper housing 42 for supply down through the flexible tubes 28 to the molding cavities.

Material of this type has a tendency to pick up a static electric charge, particularly when prefoamed by hot air, and even though the material is of sufficient size to pass through the screen 56, it has a tendency to adhere to it due to static electric attraction. This can result in clogging of the screen 56. To prevent this, an alternating current coil 58 is wrapped in a spiral-helical formation on the screen 56, either on one side or the other, or both, with a suitable connection 60 running down through the supply tube 24. The electrostatic field created by the coil 58 will repel the beads and cause them to come down through the screen. Only the oversize that cannot physically pass through the opening of the screen will stay on top. Due to the conical formation of the screen, this oversize will collect at the low point 59 which reduces the tendency of the oversize to entirely plug the screen. It will be noted that the screening arrangement 50 is removably mounted in the frame 46 and when sufficient oversize is collected therein, it may be removed. The top screen 54 is in the form of a removable lid with a handle and when the entire screening arrangement 50 is taken off, the lid 54 may be removed and the oversize dumped. In an automatic unit of this type, this may have to be done once every day or so. Since the prefoamed beads are air conveyed from the prefoamer 22 up through the supply tube 24 to the prefoam hopper, the upper lid 54 is made in the form of a screen so that the air can discharge through the top allowing the material to pass down through the lower screen 56.

The prefoamer includes a base 102 which supports a generally upright, transparent housing or chamber 106, shown as cylindrical, with a top cap 108. The interior of the housing or chamber is generally hollow and has an agitator 109 which includes a generally vertically disposed, rotatably mounted, center rod with a plurality of vertically spaced outwardly disposed arms or blades. The agitator may be driven from below by a motor, not shown, in the main cabinet 10.

A metering chamber 120 is suitably mounted on the top cap 108. The metering chamber may be suitably power operated as by an air cylinder 130 or the like.

The metering chamber 120 introduces a predetermined amount, weight and volume of material into the prefoaming chamber 106, and a warm, relatively low velocity current of air flows up from the base 102 to cause the individual plastic particles to expand while the agitator 109 breaks them up and prevents them from sticking together and lumping. When the particles have been sufficiently foamed, they are discharged through a port at the top controlled by a valve 140 operated by a suitable air cylinder 142. The current of air, which has been previously used to partially foam the beads, may be stepped up to a high velocity discharging current which will lift all of the beads, in their partially foamed condition, from the prefoam chamber and discharge them through the discharge valve 140, through the tube 24 to the prefoam hopper 26.

A sensing arrangement is positioned along the side of the chamber 106 and may include a light source 158 and a photocell or receiver 160 which are adjustably mounted on the support so that they can be raised or lowered. The light beam from the source projects through the transparent walls of the chamber 106 to the receiver 160. When the plastic material in the prefoamer has been sufficiently expanded such that it will raise and interrupt the light, the light beams trigger the discharge mechanism to rapidly exhaust the material up through the supply tube 24 to the prefoam hopper. Since the metering mechanism 120 supplies an accurate amount of the beads to the prefoamer and the final volume of the beads, just prior to discharge, can be accurately regulated by adjusting the position of the sensing mechanism 158 and 160, the precise density of the prefoamed beads supplied to the prefoam hopper 26 can be accurately determined and controlled. Note that the prefoamer works on a batch basis but is completely automatic.

The prefoam hopper may be provided with two sensing mechanisms, an upper unit 62 and a lower unit 64, each including a light source 66 and a photocell 68, both sets being adjustably mounted. The lower unit is used to detect the low level of material in the prefoam hopper, while the upper unit detects a high level. The light beams from the units may pass through the cylindrical wall 42 which for that purpose may be made of glass.

The supply of material from the prefoam hopper through the flexible tubes 28 to the molding cavities may be controlled by power operated valve elements 70 on top of the cavity elements 34.

The cabinet 10 houses a small boiler 72 which supplies steam for the heating chambers in the mold parts 32 and 34 for foaming and fusing the plastic beads into the finished article, for example a thin wall cup. The connections have not been shown. The cabinet itself would house the rest of the controls for the unit, and this is explained in detail in connection with FIGURES 5 through 7, and the only outside connections that will be required would be for water, electricity and air, none of these connections being shown. The water would be used, first, as a cooling medium to cool the molding cavity and, second, through the boiler to supply steam as the heating medium for the molding cavity. Electricity will be used for the various controls explained hereinafter and the destaticizers. The air supply would be used for the prefoamer and the various air cylinders controlling valves, etc., as well as for conveying material through the tubes, loading or filling the molding cavity in the mold parts 30 with the prefoam material, and for stripping and ejecting the finished articles.

In FIGURES 5, 6 and 7, the control and power circuit is shown starting with a source 300, in FIGURE 7, connected to a combination automatic and manual switch 302, connected in turn by a suitable lead 304 to a series of switches, in FIGURE 5, designated from left to right, switch 306 "Clamp"; switch 308 "Fill"; switch 310 "Steam"; switch 312 "Steam Injection"; switch 314 "Water"; switch 316 "Drain", all of which are manual switches shown on the front of the control box 14 in FIGURE 2, each with an indicator light. In FIGURE 6, the light sources and photocells for the high and low level controls 62 and 64 on the prefoam hopper are shown, which are connected by suitable leads 318 back to the source in FIGURE 7 through relays. Three relays are shown, the first designated 320 "No. 1 Relay"; the second designated 322 "No. 2 Relay"; and the third designated 324 "No. 3 Relay." Note that the first relay 320 is connected to the photocells and sensing arrangement controlling the levels in the prefoamer 26. Connected to the first relay 320 is a minimum temperature switch 326 which responds to the temperature of the air being supplied to the prefoamer 22 so that when the minimum temperature is reached, switch 326 will close allowing the first relay 320 to cut in. In a sense this is an overriding control for the entire circuit. Until the minimum temperature switch 326 closes, the machine cannot cycle. Tied into the No. 1 relay 320 are three additional switches, 328 responsive to water pressure; 330 responsive to air pressure; and 332 responsive to steam pressure, each of which has an indicator light, shown to the right thereof, which will be mounted on the control panel 14 in FIGURE 2. Thus, if any one of these switches is open, this would cut out the first relay 320, thereby rendering the entire circuit inoperative. Thus, the machine will automatically respond to the temperature of the air being supplied to the prefoamer, the water pressure for cooling the molding cavity jackets, the air pressure for moving the beads through the various tubes, for filling the mold cavity and for ejecting the finished part, and the steam pressure which is the heating source for the mold cavity.

The second relay 322 is connected to recycle microswitches 334 which, on the machine itself, are positioned to be contacted and actuated by the cavity members 34 or bridge arrangement 36, when they reach their top position, shown generally in FIGURES 1 and 2, to start a full new cycle of the machine.

The third relay 324 is connected by suitable lines 336 through 348, shown in detail to show the interconnection between FIGURES 5 and 7, to the first series of switches 306 through 316, and a second series thereabove in FIGURE 5 to be explained hereinafter. Thus, the relay is connected to a clamp cylinder micro 350, which is actuated when the mold cavities are fully closed and a fill micro 352 which would be located next to the mold cavities and would be actuated when the mold cavities are closed to thereby initiate filling of the cavities by opening the valves or plunger control arrangement 70. Additional microswitches 354, also mounted on the outside in the area of the molding cavities, would be engaged to initiate the airstream to fill the molding cavities with material. A so-called blow-off micro 356, also positioned in the area of the mold cavities, would be suitably closed, when the mold cavities are open, to blow the molded part off of the core. A timer motor 358 controls the switches 360 through 374 timing the sequence of events, first, the relay locking cylinder; second, the fill cycle; third, the steam or precooking cycle; fourth, the direct steam injection into the molding cavity with the prefoamed beads; fifth, the cooling water being supplied to the jackets around the molding cavity; sixth, the drain of the cooling water from the jackets; seventh, the purging air; and, eighth, the locking switch for the timer motor circuit. The indicator lamps, shown across the bottom of FIGURE 5 but unnumbered, would be mounted on the control panel 14 in FIGURE 2 to show when each particular phase of the cycle is taking place.

The lamp source 158 and photocell 160 for the prefoamer are shown at the top of FIGURE 5 connected by leads 376 to three additional relays in FIGURE 6, the first 378 being designated "No. 4 Relay"; the second 380 being designated "No. 5 Relay"; and the third 382 being designated "No. 6 Relay." A motor 384 is interconnected to drive the agitator in the prefoamer. The three relays No. 4, No. 5 and No. 6 are for the prefoamer control and are interconnected to make it automatic, the shut-off and start as set forth hereinafter. A unit 386, designated "Prefoam Supply Time Delay" in FIGURE 6 is interconnected to cause the prefoamer to continue its cycle and to discharge, under the conditions set forth hereinafter. Another unit 388, designated "Dry Cycle Time Delay" is connected to cause the machine to initially go through a cycle or two without feeding plastic material to the molding cavity so that all of the mold parts, etc. are brought up to the proper operating temperature before plastic material begins to flow down. A prefoamer circuit 389, in FIGURE 5, programs the operation and cycle of the prefoamer and is connected by leads 390 to the No. 6 relay.

The use, operation and function of the invention are as follows:

The molding machine and method are fully automated so that the machine requires a minimum of service and maintenance and will automatically protect itself against failures. The machine is fully integrated with all services built in so that it only requires a connection for water, electricity and pressure air. From time to time, an operator must fill the bead supply hopper 18 with impregnated beads, say once a day or so.

A measured charge of material, measured as to weight and volume, is supplied to the prefoamer, which is constructed to automatically discharge this shot or batch of material when it reaches a certain volume—a volume that can be closely selected and controlled. Thus, the prefoam material going to the prefoam hopper 26 will have a quite accurate density, regardless of the quality of the original beads. Since the prefoamer 22 is not time conscious but reacts to a certain volume of material, regardless of how long or how short it takes the material to partially foam to that volume, the material being discharged and supplied to the prefoam hopper will be at an exact density. It may get there sooner or later, but its density will be proper.

The details of the prefoam hopper in FIGURE 4 are important in that the oversize material must be screened out, but at the same time the undersize, which is charged with static electricity, must be made to go through the screen. This has been accomplished by the helical and spiral coil which applies an alternating electrostatic field to the screen, thereby repelling the undersize beads causing them to go through the screen and collect in the prefoam hopper. From time to time, the oversize which is caught on the screen may be dumped. The light and photocells 62 and 64 control the upper and lower levels of material in the hopper. The lower screen is cone shaped so that the oversize will collect in the middle and won't otherwise clog the outside of the screen.

The machine is shown with two molding cavities, for molding thin wall articles, such as foam plastic cups for hot drink purposes, but it should be understood that it may have more or less cavities. But in any event, the consumption of the molding cavities, on a time basis, is closely related to the productive capacity of the prefoamer, so that the material is consumed generally as fast as it is prefoamed. Note that the hopper 26 for prefoam is by no means a large reservoir. Thus, the prefoam supplied by the prefoamer 22 will be used almost immediately. The prefoam, at an accurate density, will not have a long waiting period during which the gas can escape and the quality of the beads can otherwise deteriorate. The controls are as follows: When the machine is initially energized and all of the services have been connected, the "Dry Cycle Time Delay" 388 in FIGURE 7 will cause the machine to go through an initial cycle in which everything is brought up to its operating temperature in and around the mold cavities, but the cavities are not filled with plastic. In other words, the machine will dry cycle at least once without forming a plastic article. This is considered desirable since the first foamed plastic articles formed on molding machines are almost inevitably bad. While one dry cycle has been referred to, it should be understood that two or more may be used and the mechanism may be accordingly set.

The prefoamer 22 will supply prefoam material to the hopper 26 at a certain rate which may vary depending upon the quality of the raw material coming to the prefoamer. For example, the quality of the raw material may be very good and the prefoamer 22 may be supplying material to the hopper 26 faster than the molding cavities are consuming it, resulting in the level of material building up in the prefoam hopper 26. Photocell set 62 sensing this high level in the prefoam hopper will automatically stop the prefoamer by deenergizing the metering mechanism 120 until the level of prefoam material in the prefoam hopper 26 has fallen. The low level in the preform hopper 26 will be detected by the light and photocell set 64 which reenergize the metering device 120, again supplying measured shots of material to the prefoamer 22. When the upper light and photocell set 62 signal the prefoamer that the high level of material has been reached in the prefoam hopper 26, the relays 378, 380 and 382 cause the prefoamer to continue the cycle it is then in, through discharge, but thereafter the metering device 120 will not supply additional material to the prefoamer 22.

If the quality of the material is low causing the prefoamer to take longer to supply batches of material, the molding cavities may consume the material from the prefoam hopper 26 at a faster rate than is being supplied to the hopper by the prefoamer. This will cause the level of the material to fall below the level of the lower light and photocell set 64. At the same time that the lower light and photocell set 64 energize the prefoamer, they also energize the "Prefoam Supply Time Delay" 386 which, after a certain period of time, for example 10 minutes, will shut down the entire machine if the level of the prefoam material in the hopper 26 has not risen back up above the lower sensing mechanism 64. This automatically prevents the molding cavities from running out of material, the time between the sensing of low level by unit 64 and the shut down of the machine being less than the time required for the molding cavities to consume all of the material remaining in the bottom of the prefoam hopper and supply pipes.

The circuit also has the features that the machine will either not start up or will shut down if a certain minimum temperature of hot air is not being supplied, or if the water pressure, air pressure, or steam pressure drop below certain levels or are not up to certain levels, but with the overriding feature that if anyone of these pressures or temperatures drops below the prescribed level during the cycle of operation, the relays will automatically lock the machine into finishing that cycle and only stopping at the end of the cycle.

Note that the "Dry Cycle Time Delay" 388 is such that if at any time service is interrupted and any of the controls shut the machine down, when it starts up again, it will go through one or two, or whatever number is selected, of dry cycles to fully heat the molding cavities again.

While the preferred form of the invention has been shown and described, suitable additional modifications, changes, substitutions, and alterations may be made without departing from the invention's fundamental theme.

We claim:

1. A method of molding foamed plastic articles from finely divided foamable plastic beads impregnated with a blowing agent, including the steps of partially foaming a certain amount of the plastic beads, on a batch basis, to a certain density, immediately and continuously molding articles with the partially foamed beads, the volume of each batch from the partial foaming step being unrelated to the volume of partially foamed beads used in each molding step, and timing the consumption of partially foamed beads by the molding step and the rate of supply of such beads by the partial foaming step such that the partially foamed beads will be immediately consumed in the molding step, on a continuous basis, without any appreciable delay time between the partial foaming and molding steps.

2. In a machine for molding foamed plastic articles from finely divided foamable plastic beads impregnated with a blowing agent, prefoaming means for generally continuously and automatically partially foaming a certain amount of the plastic beads, on a batch basis, to a certain density, an automatic molding arrangement for generally continuously molding desired articles from the partially foamed beads, a supply arrangement for supplying the partially foamed beads from the prefoaming means to the automatic molding arrangement, means for relating the consumption of the partially foamed beads by the molding arrangement to the supply of such beads by the prefoaming means such that the partially foamed beads will be consumed in the molding arrangement without any appreciable delay in the supply arrangement after the beads leave the prefoaming means, and a control for the prefoaming means and the molding arrangement so that one will not get appreciably ahead of the other.

3. The structure of claim 2 further characterized in that the supply arrangement includes a hopper with a supply connection running to the prefoaming means, a discharge connection running to the molding arrangement, and a screening arrangement in the hopper to prevent oversize beads from going on to the molding arrangement.

4. The structure of claim 3 further characterized by and including means for applying an electrostatic field to the screening arrangement to prevent beads from sticking to it due to electrostatic attraction.

5. The structure of claim 3 further characterized by and including a sensing arrangement on the prefoam hopper constructed to indicate when a certain high level of prefoamed beads has been acquired in the prefoam hopper, means responsive to the sensing means for shutting off the source of supply to the prefoamer when the high level of prefoamed beads in the prefoam hopper has been reached, and means for causing the prefoam means to complete any cycle of operation, then in process, when it receives a signal from the prefoamer sensing means to shut down so that the beads in the prefoamer will be discharged to the hopper before the prefoamer is shut down.

6. The structure of claim 5 including sensing means on the prefoam hopper for sensing when the level of prefoamed beads has fallen to a certain low level and means responsive thereto for energizing the prefoaming means.

7. The structure of claim 6 further characterized by and including means responsive to the sensing means for determining when a certain low level has been reached in the prefoam hopper for causing the machine to shut down if the beads have not built up again in the prefoam hopper above the certain low level after a certain period of time.

8. The structure of claim 2 further characterized by and including an automatic means for cycling the machine through at least one cycle, after start up, before partially foamed beads are supplied by the supply arrangement to the molding arrangement so that the molding arrangement will be brought up to operating temperature.

9. The structure of claim 8 further characterized by and including a source of supply for finely divided foamable plastic beads connected to the prefoaming means.

10. The structure of claim 9 further characterized by and including water supply means for supplying cooling water to the molding arrangement, a boiler for supplying steam to the molding arrangement, a hot air source for supplying hot air to the prefoaming means, and means responsive to the temperature of the air supplied by the hot air source such that the machine will not operate when the temperature of the hot air is below or falls below a certain temperature.

11. The structure of claim 10 further characterized by and including means for shutting down the machine when the pressure of the water being supplied to the machine, the pressure of the steam being supplied or the temperature of the air being supplied, or any one of them, fall below certain levels, and means for continuing a cycle of operation, but shutting down at the end of such cycle when any one of the levels is reached during a cycle of operation.

12. The structure of claim 11 further characterized by and including means for reenergizing the machine when the particular level that caused the machine to shut down has been reached again.

13. In a hopper for housing partially foamed foamable plastic finely divided particles, a generally upright housing having an inlet generally at the top and an outlet generally at the bottom, a screening arrangement on the inlet for preventing oversize particles from entering the housing, including a generally annular screening medium adapted to receive material from the inlet, and means for creating an alternating electrostatic field across the screening medium so that the particles will be prevented from clinging to the screening medium due to static electricity.

References Cited
UNITED STATES PATENTS

| | | | |
|---|---|---|---|
| 704,586 | 7/1902 | Sexton | 222—189 XR |
| 1,833,028 | 11/1931 | Lindley | 222—189 XR |
| 2,301,136 | 11/1942 | Moreland et al. | 222—56 |
| 2,997,205 | 8/1961 | Schuerger et al. | 222—56 XR |
| 3,091,368 | 5/1963 | Harley et al. | 222—56 |
| 3,129,464 | 4/1964 | Heider | 264—53 XR |
| 3,224,037 | 12/1965 | Robbins et al. | 264—51 XR |
| 3,231,933 | 2/1966 | Benedetto | 264—51 XR |
| 3,309,440 | 3/1967 | Kracht | 264—53 |

JULIUS FROME, Primary Examiner.

PHILIP E. ANDERSON, Assistant Examiner.

U.S. Cl. X.R.

264—24; 18—5, 2